(12) United States Patent
Zheng et al.

(10) Patent No.: US 8,009,939 B2
(45) Date of Patent: Aug. 30, 2011

(54) FIBEROPTIC CLEARANCE DETECTION SYSTEM AND METHOD

(75) Inventors: Danian Zheng, Simpsonville, SC (US); Peter John Eisenzopf, Altamont, NY (US); Kevin Thomas McCarthy, Troy, NY (US); Roy Paul Swintek, Altamont, NY (US); Norman Arnold Turnquist, Sloansville, NY (US); Hua Xia, Altamont, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/241,527

(22) Filed: Sep. 30, 2008

(65) Prior Publication Data

US 2010/0080500 A1   Apr. 1, 2010

(51) Int. Cl.
  *G02B 6/00* (2006.01)
  *G02B 6/42* (2006.01)
  *G01B 11/14* (2006.01)
  *G01J 1/04* (2006.01)

(52) U.S. Cl. ............ 385/12; 385/31; 385/39; 385/139; 356/622; 250/227.11; 250/227.23

(58) Field of Classification Search .............. 385/12, 385/31, 39, 117, 139; 356/241.1–241.2, 356/241.5, 496, 614, 622, 625, 630; 250/227.11, 250/227.23, 227.28
See application file for complete search history.

(56) References Cited

U.S. PATENT DOCUMENTS

| | | | |
|---|---|---|---|
| 4,786,188 A | | 11/1988 | Myhre et al. |
| 5,739,524 A | * | 4/1998 | Fally ............... 250/227.11 |
| 6,513,971 B2 | | 2/2003 | Tubbs |
| 7,053,362 B2 | * | 5/2006 | Tobiason et al. ...... 250/231.16 |
| 7,388,680 B2 | * | 6/2008 | Heyworth ............. 356/630 |
| 2002/0093665 A1 | * | 7/2002 | Heyworth ............. 356/614 |

OTHER PUBLICATIONS

R. J. Baumbick, "Fiber Optics for Aircraft Engine/Inlet Control," U.S. Department of Commerce National Technical Information Service, N8131190, Sep. 1981, pp. 1-17.

S. Z. Cao et al., "Measurement of Rotating Blade Tip Clearance with Fibre-Optic Probe," Journal of Physics: Conference Series, vol. 48, 2006, pp. 873-877.

* cited by examiner

*Primary Examiner* — Uyen Chau N Le
*Assistant Examiner* — Michael P Mooney
(74) *Attorney, Agent, or Firm* — Ann M. Agosti

(57) ABSTRACT

A fiberoptic system for clearance detection between rotating and stationary turbomachinery components is presented. The system comprises an optical fiber probe comprising a plurality of optical fibers, at least one of the optical fibers comprising a transmission fiber and at least one of the optical fibers comprising a signal fiber; a light source for providing light through the transmission fiber towards a target; filters for receiving light from the signal fibers, at least two of the filters for filtering different wavelengths; and at least one photodetector for receiving filtered light from the filters.

11 Claims, 6 Drawing Sheets

FIBEROPTIC CLEARANCE DETECTION SYSTEM AND METHOD

BACKGROUND

The subject matter disclosed herein relates generally to clearance detection.

Clearances between rotor blade tips and casings in turbomachinery such as steam turbine engines change during and following transient events and affect turbomachinery/engine performance. In a more specific example, axial and radial clearances inside steam turbines between rotors and stators have been limiting factors on size, start-up, loading, and shutdown of steam turbines. Currently, conservative clearances and transition times are used to minimize contact between steam turbine stators and rotors.

It would be desirable for a clearance sensing system to have high mechanical strength to tolerate various vibration, temperature, and pressure conditions in turbomachinery installation and maintenance and to have thermal properties that are insensitive to the environment. In addition, turbine clearances are sometimes asymmetric, so it is desirable that a clearance sensing system measure clearances at multiple locations. It would also be desirable to have a durable system and technique to provide a more compact steam turbine with faster start-up capabilities.

BRIEF DESCRIPTION

Briefly, in one embodiment disclosed herein, a system for measuring clearance comprises an optical fiber probe comprising a plurality of optical fibers, at least one of the optical fibers comprising a transmission fiber and at least one of the optical fibers comprising a signal fiber; a light source for providing light through the transmission fiber towards a target; filters for discriminating light from the signal fibers, at least two of the filters for filtering different wavelengths; and at least one photodetector for receiving filtered light from the filters.

In another embodiment disclosed herein, a method comprises transmitting light through at least one transmission optical fiber towards a target; receiving light reflected from the target through at least one signal optical fiber; filtering the received light at at least two different wavelengths; and using the filtered light to detect a clearance variation.

In another embodiment disclosed herein, an optical fiber probe comprises a plurality of optical fibers, a moisture-resistant enclosure enclosing distal ends of the optical fibers, and a hydrophobic layer situated over an end of the probe for preventing moisture from reaching the optical fibers.

In yet another embodiment disclosed herein, a system comprises a steam turbine comprising a rotor and a stator, a moisture resistant optical fiber probe comprising a plurality of optical fibers, at least one of the optical fibers comprising a transmission fiber and at least three of the optical fibers comprising signal fibers, a light source for providing light through the transmission fiber towards the steam turbine rotor; filters for discriminating light from the signal fibers and for filtering out unwanted light; at least one photodetector for receiving filtered light from the filters; and a processor for receiving signals from the at least one photodetector and detecting a variation in distance between the steam turbine rotor and the steam turbine stator.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention include a system and a method for detecting clearance. In one more specific example, the clearance detection is within a steam turbine. Embodiments described herein are also applicable and beneficial for other types of turbomachinery, for example, such as gas turbines, compressors, and generators.

Figure 1:
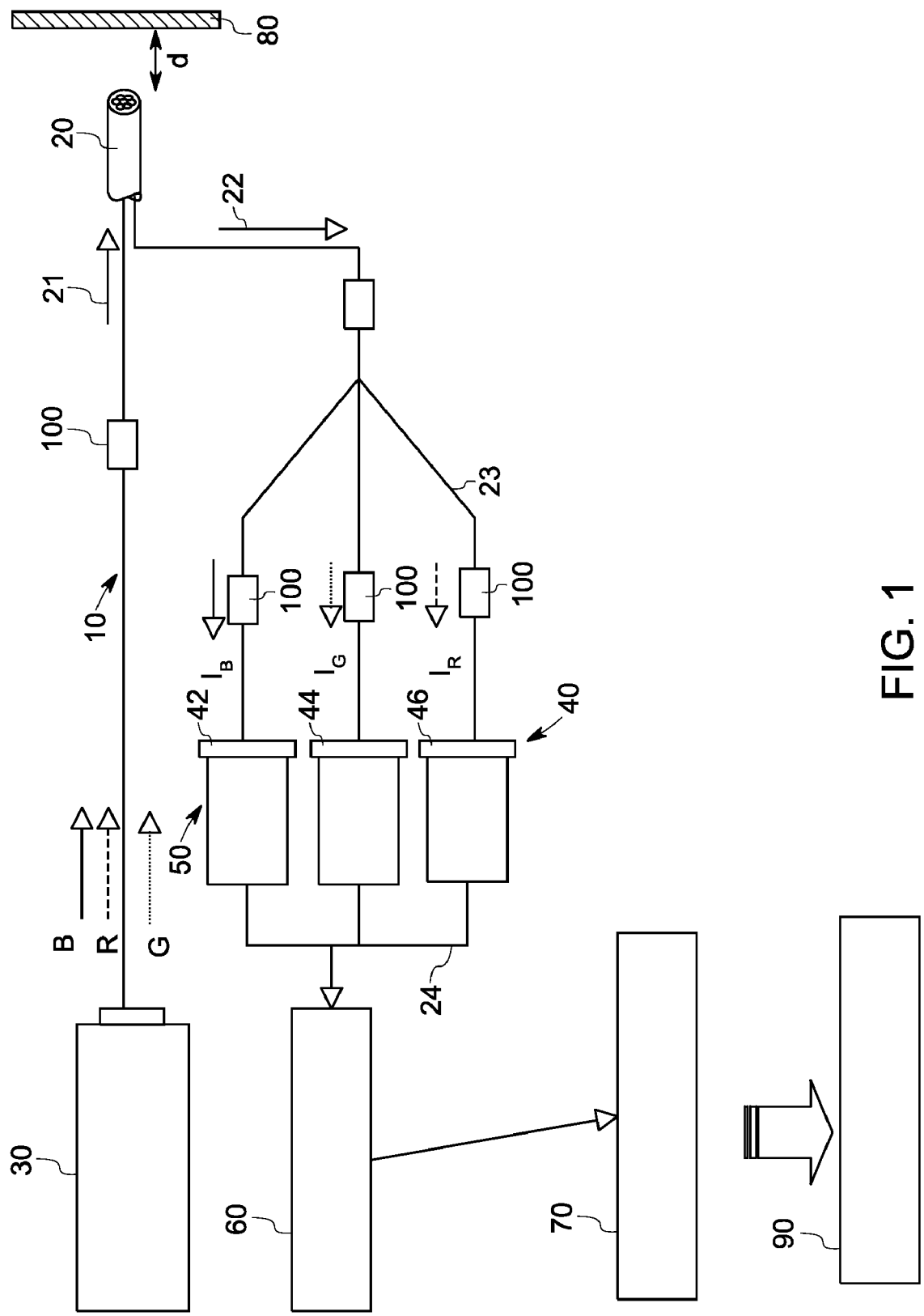
FIG. 1 is a schematic view of a single-point fiberoptic clearance detection system in accordance with one aspect of the invention.

FIG. 1 illustrates a schematic view of a clearance detection system 10 in accordance with one embodiment of the present invention wherein an optical fiber probe 20 comprises a plurality of optical fibers 21 and 22, at least one of the optical fibers 21 comprising a transmission fiber and at least one of the optical fibers 22 comprising a signal fiber; a light source 30 for providing light through the transmission fiber 21 towards a target 80; filters 40 for receiving light from the signal fiber 22, at least two of the filters 40 for filtering different wavelengths; and at least one photodetector 50 for receiving filtered light from the filters 40. As used herein, singular forms such as "a," "an," and "the" include plural referents unless the context clearly dictates otherwise.

In one embodiment, the light source 30 comprises a multi-wavelength light source such as an RGB emitting laser which is optionally tunable. In this embodiment, the emitted lights are of wavelengths of 405 nm to 471 nm, 515 nm to 555 nm, and 635 nm to 780 nm. In this embodiment, the filters 40 may include a narrow band interference filter 42 for transmitting light in the range of 405 nm to 471 nm, a red filter 44 for transmitting light in the range of 635 nm to 780 nm, and a green filter 46 for transmitting light in the range of 515 nm to 555 nm. The above described wavelength ranges of the light source and filters are for purposes of example only, however it is recommended that the ranges of the light source and filters be coordinated.

One or more photodetectors 50 may be present. In one embodiment, a plurality of photodetectors 50 are located behind corresponding filters 40 for receiving the filtered light. In another embodiment (not shown) one photodetector is used with a rotating wheel and different filters. In one embodiment, the photodetectors comprise silicon avalanche photodiodes. In another embodiment, wherein a selected laser wavelength range of a light source or filter is longer than 1.0 micrometer, an InGaAs-based photodetector or photodetector array is recommended.

A processor may be used for receiving signals from the at least one photodetector and detecting a variation in distance between the steam turbine rotor and the steam turbine stator. In one embodiment, the processor comprises a signal processor 60 for receiving and processing the signals, a data processor 70 for processing data from signal processor 60. Signals from the processor may then be used by a controller 90 for steam turbine operation condition control.

Figure 6:
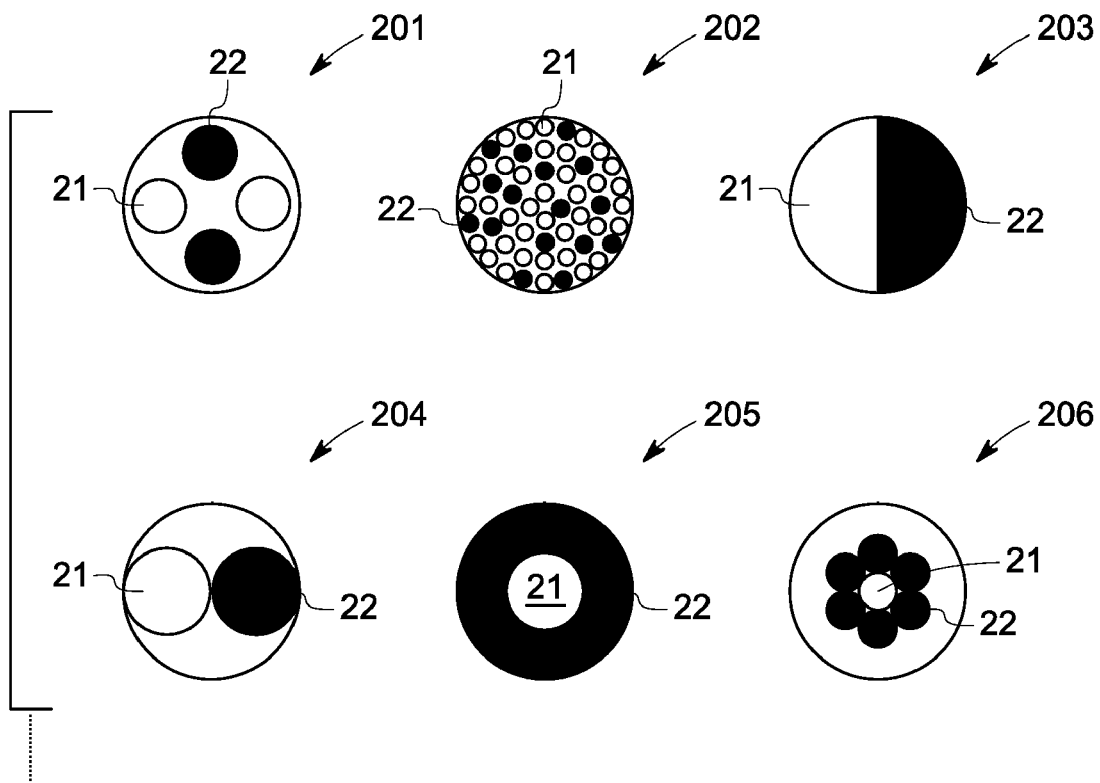
FIG. 6 is several sectional views illustrating various arrangements of transmission fibers and signal fibers in accordance with embodiments of the invention.

The optical fiber probe 20 comprises a reflection based fiber bundle, which comprises at least two fibers, at least one fiber 21 (the transmission fiber) being designated for light delivering and at least one other fiber (the signal fiber) 22 being designated for reflectance receiving as indicated in the FIG. 1. The received signal light is sent to the filters 40 and the photodetectors 50. In one embodiment, the light is sent through an optical splitter 23. In another embodiment, signal fiber 22 comprises a plurality of signal fibers (such as shown in FIG. 6) that transmit light directly to the filters without the need of a splitter. The transmission fiber 21 transmits light from the light source 30 towards a target 80. The signal fiber 22 transmits signals reflected from the target 80 to the filters 40. Lights from the photodetectors 50 may be sent to the signal processor 60 by way of an optical combiner 24.

For effective transmission of visible to near infrared light, in one embodiment the fibers 21, 22 inside the optical fiber probe 20 comprise UV-grade quartz fiber having a doped fiber clad, a pure silica fiber core, a fiber core refractive index $n_{core}$, and a fiber clad refractive index $n_{clad}$, where $n_{core} > n_{clad}$. Doping ions for the fiber clad may comprise, for example, fluorine, chlorine, boron, or any combination thereof. In one embodiment, the fiber comprises a pure silica core with a fluorine-doped clad. In another embodiment, the fiber comprises a sapphire core with a metalized or polymerized clad. The fiber core diameter is typically in the range of 50 microns to 62.5 microns for quartz fibers and 70 microns to 250 microns for sapphire fibers. Optical fiber connectors 100 may be used to connect the light source 30, the probe 20, the optical splitter 23, and the filters 40, respectively.

Figure 2:
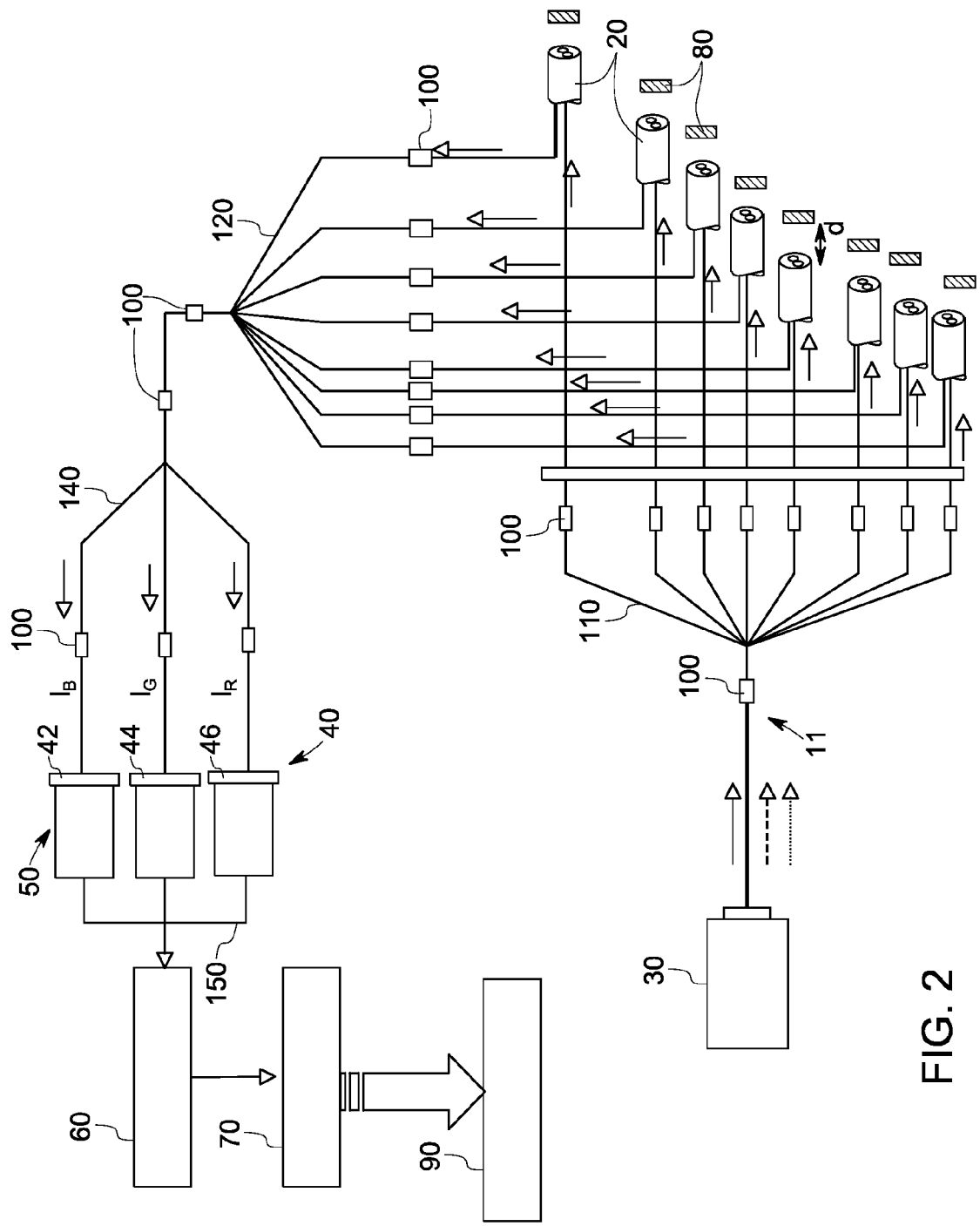
FIG. 2 is a schematic view of a multi-point fiberoptic clearance detection system in accordance with another aspect of the invention.

Multiple probes may optionally share a common light source 30 through use of a splitter 110 as shown in FIG. 2 for example. Additionally, each of the filters 40 can also receive light from one or more than one signal fiber. FIG. 2 illustrates a system 11 for multi-point clearance detection in accordance with an embodiment of the present invention, in which the optical fiber probes 20 are distributed to different locations inside a steam turbine through an optical splitter 110. In one embodiment, the reflectance signals from all probes 20 are recombined with an optical combiner 120. Light from the optical combiner 120 is sent to the filters 40 and the photodetectors 50 by way of an optical splitter 140. Such multiplexing and distribution embodiments may include an optical switch 130 to gate times for sequentially monitoring static and dynamic clearance at different steam turbine locations 80. Lights from photodetectors 50 may be sent to the signal processor 60 by way of an optical combiner 150 and are then sent to the data processor 70.

Figure 3:
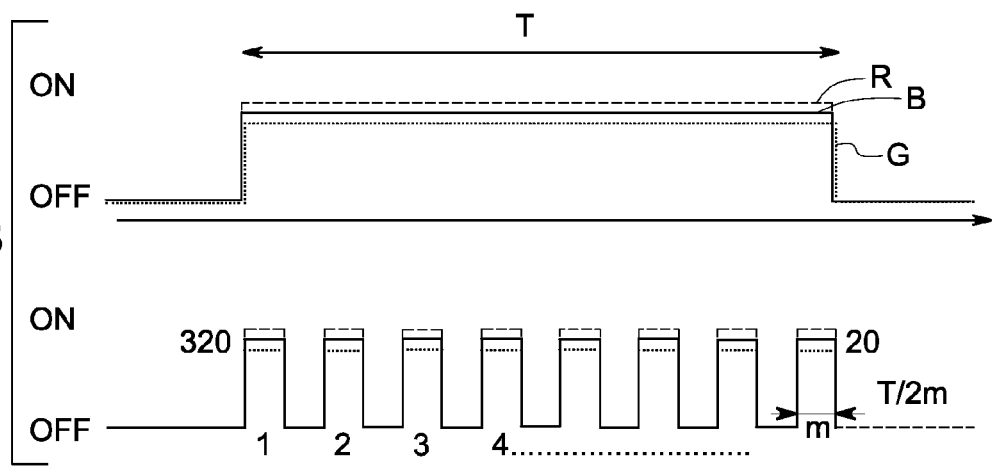
FIG. 3 is a schematic representation of optical switch time gating method to measure each clearance from an optical fiber probe with multiple laser wavelength modulation in accordance with one aspect of the invention.

Referring to FIG. 3, the optical switch 130 in FIG. 2 controls detection of clearance from each optical fiber probe 20 by a time sequence 320 for each of m optical fiber probes 20. During each pulsed laser light exposure time T, a time period of T/2m is used for clearance detection from each optical fiber probe 20. During each time gating period T, only one optical fiber probe is measuring clearance.

Figure 4:
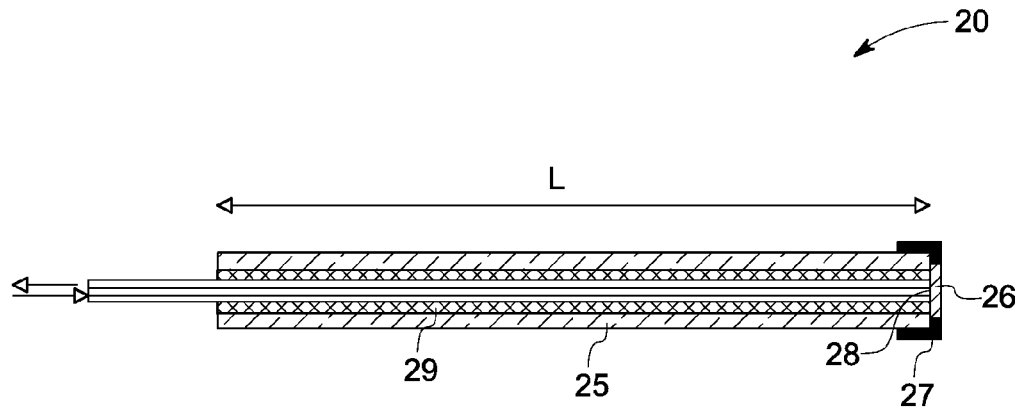
FIG. 4 is a sectional view which illustrates an optical fiber probe according to one embodiment of the invention.

FIG. 4 is a diagrammatic representation of an optical fiber probe 20 as implemented in the systems 10 and 11 of FIG. 1 and FIG. 2. The optical fiber probe 20 has an enclosure 25 (or "ferrule") enclosing the transmission and the signal fibers, a hydrophobic layer 26 situated over an end of the probe for preventing moisture from reaching and corroding the optical fibers, and a seal 27 sealing the fibers, the enclosure and the hydrophobic layer. The ferrule 25 may comprise an iron alloy such as stainless steel, an austenitic nickel-based superalloy such as Inconel™ 625 alloy (melting point: 2450° F.), or a nickel steel alloy such as Invar 36 alloy (melting point: 2600° F.). The hydrophobic layer 26 may comprise a sapphire plate or alumina ($Al_2O_3$) coating layer and act as a window for transmitting light from and to the optical fibers. A broadband transmission layer 28 may be disposed at the distal end of the fibers on either side of the hydrophobic layer and may comprise MgO, for example. The seal 27 may be made of Pt or Au. In one embodiment, between the fibers and the enclosure 25, there is a gap filled with ceramic bonding material 29. In a more specific embodiment, the gap is 25 micrometers, and the bonding material 29 is high-temperature ceramic adhesive comprising alumina/silicate material.

The selection of the adhesive material 29 may be based on the mitigation of the thermal stress between the fibers and the metal enclosure at high temperatures. In one example, when Inconel™ 625 (coefficient of thermal expansion (CTE): about 6.4 in/in/° F.) is used as the enclosure material, the adhesive material comprises an alumina based adhesive having CTEs that are in the range of 4.4 in/in/° F. In another example where Titanium (CTE: about 3.9 in/in/° F.) is used as the enclosure material, the adhesive material comprises either boron carbide based adhesive with a CTE of 2.6 in/in/° F.) or silicon carbide based adhesive with a CTE of 2.9 in/in/° F. It is useful for the selected adhesive materials to survive temperatures in excess of 1000° F. temperature. Such adhesives are commercially available with two example suppliers being Aramco Products, Inc. and Cotronics Corporation. Even when lower temperature limits are involved, adhesive materials may still be used for providing a stress buffer.

Figure 5:
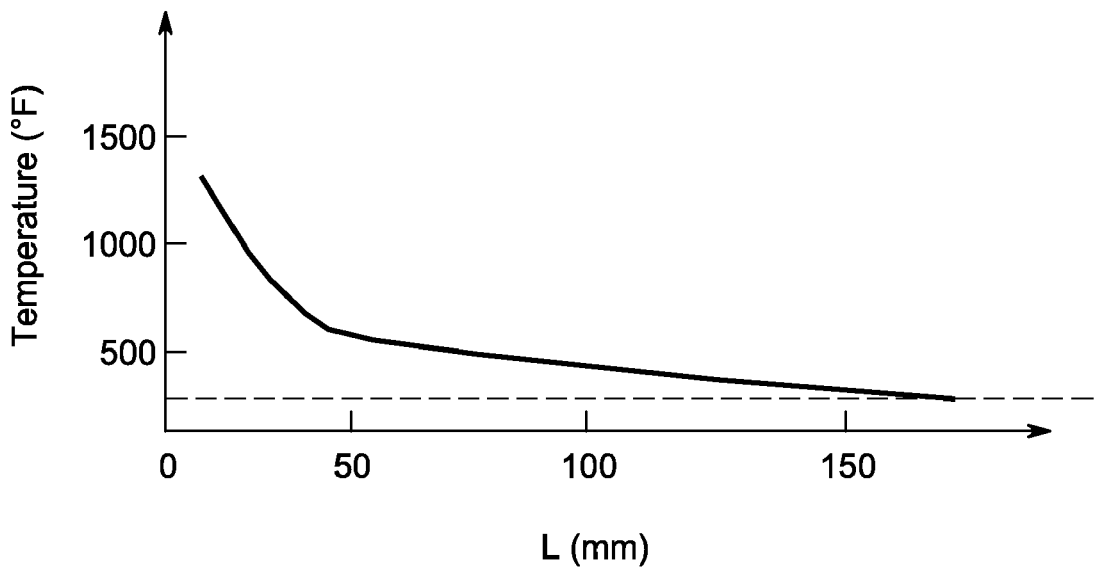
FIG. 5 is a graph illustrating temperatures in the optical fiber probe vs distance from the target.

For steam turbine applications, the packaging is designed to enable the optical fiber probe 20 to operate in moist, corrosive, and high temperature environments and to resist damage during turbomachinery installation and maintenance. A packaging length L (FIG. 4) may be selected to be of sufficient length so that package temperature that is experienced in the vicinity of the target is sufficiently reduced across the length of package 25 so as to not damage equipment at the other (remote) end of package 25. A sufficient temperature gradient may be designed based on package length and materials. In one example, if the rotor temperature inside the steam turbine, i.e., the target 80, is about 1500° F., the packaging length L of the probe 20 is longer than the thickness of the stator core. In another example, the optical fiber probe is long enough so that the temperature around the end of the package 25 is decreased to be below 200° F. FIG. 5 is a simulated graph wherein the temperature at the target is about 1500° F., the package length L is along the X axis, and the resulting temperature at the remote end of the package is along the Y axis.

Figure 7:
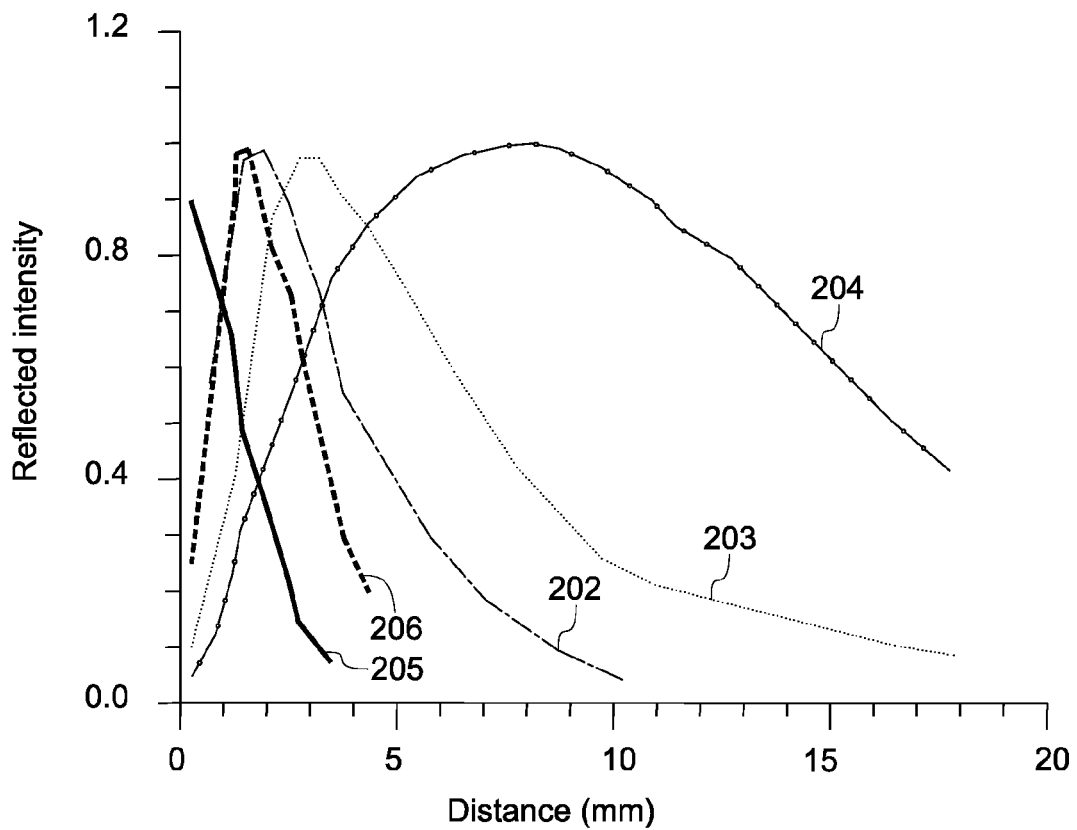
FIG. 7 is a graph illustrating reflected intensities of lights vs transmitted distances through several of the arrangements of FIG. 4.

The optical probe 20 may comprise many fibers, one or more of which are transmission fibers used for light delivering and one or more of which are signal fibers for reflectance receiving. FIG. 6 shows arrangements 201-206 of transmission fibers 21 and signal fibers 22 in accordance with embodiments of the invention. Referring to FIG. 6, the transmission fibers 21 and the signal fibers 22 according to the arrangements 201-206 may be arranged in multiple pairs 201, in a random manner 202, in a half/half arrangement 203, in one pair 204, or coaxially 205 or 206, for example. In a specific embodiment, every two of the six signal fibers 22 of the arrangement 206 goes to one of the filters 40 of FIG. 1 and no splitter is needed. FIG. 7 is a graph showing measured clearance responses from different fiber bundle arrangements 202-206 of FIG. 6. Each type of fiber configuration has a unique standoff distance and associated sensitivity.

Figure 8:
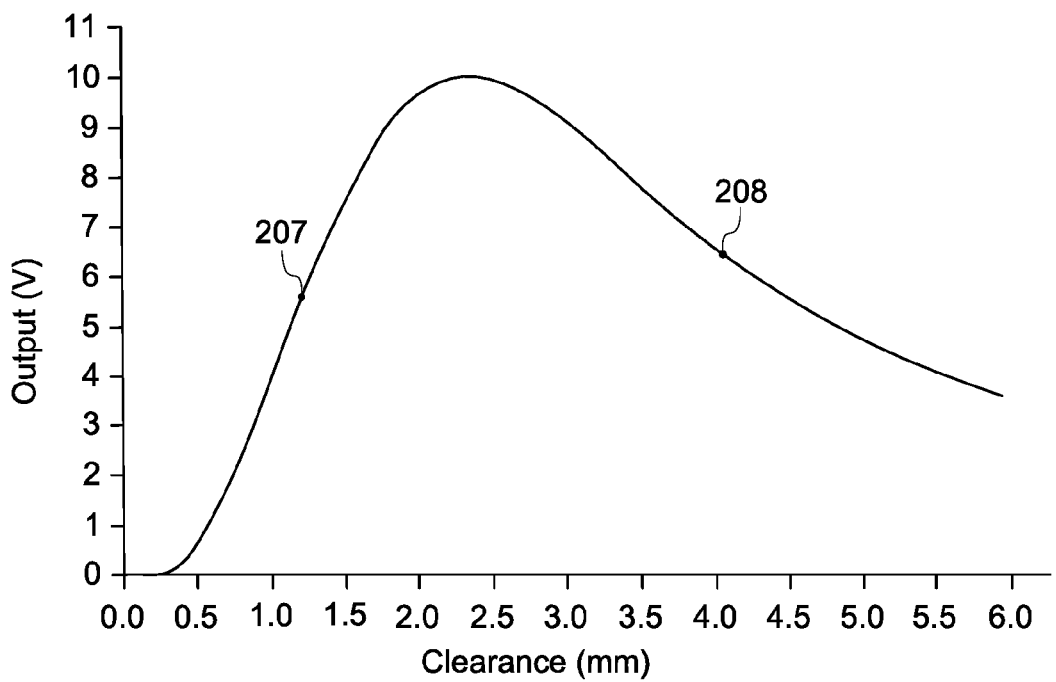
FIG. 8 is a graph illustrating two clearance sensing points from the high-sensitive reflectance signal ranges.

Static and dynamic clearance measurements are improved when the optical fiber probe is set at an optimal distance from the target surface. Such a distance is defined as a "working point". The distance or working point may vary depending upon the fiber configuration inside the optical fiber probe 20. FIG. 8 shows two "working points" for an exemplar probe, defined as front and rear clearance sensing points 207 (1.2 mm) and 208 (4.1 mm). The clearance can be measured by setting the probe distance either at front clearance sensing point 207 which is of higher sensitivity with a shorter standoff (distance) from the target, or at rear clearance sensing point 208 which is of a relative lower sensitivity but with a longer standoff (distance) from the target. When the clearance sensing point is chosen, the static and dynamic clearances can be measured by the signal intensity or power level. When using different wavelengths, the signal processing will be used to obtain a differential of each wavelength signal and the relative change of different wavelengths.

The standoff distance of an optical fiber probe may be selected at least in part based upon the fiber arrangement or configuration. For example, as can be seen from the graph of FIG. 7, a fiber bundle with short standoff may have a higher sensitivity because of its steep front response curve feature. From clearance probe response curves in FIG. 7 and FIG. 8, there are two points that could provide proper sensitivities. One is defined as front working point, which is first position for setting the optical fiber probe for clearance measurement. The other is defined as the rear working point.

If desired, for clearance sensing at a specific location, two probes can be used with one at the front working point and the other at the rear working point with the differentiation between two sensing signals being used for precise static clearance determination. However, one probe either at front or at rear working point could be used for dynamic clearance sensing. The selection of a fiber bundle type and working point depends upon the maximum clearance that needs to be measured at a specific steam turbine location.

In one detection example, intensities of lights in signal fibers are $I_R$, $I_G$, $I_B$, an initial distance between the probe 20 and the target 80 is $d_0$, and the clearance variation $\Delta d$ between earlier time $t_1$ and later time $t_2$ is determined respectively by $$\Delta d = \frac{I_G(d_2, t_2) - I_B(d_2, t_2)}{I_G(d_1, t_1) - I_B(d_1, t_1)} d_o,$$

$$\Delta d = \frac{I_R(d_2, t_2) - I_B(d_2, t_2)}{I_R(d_1, t_1) - I_B(d_1, t_1)} d_o \text{ and}$$

$$\Delta d = \frac{I_R(d_2, t_2) - I_G(d_2, t_2)}{I_R(d_1, t_1) - I_G(d_1, t_1)} d_o.$$

Differential signal processing is useful to mitigate laser light fluctuation and some specious events, such as steam absorption induced error. Fault diagnostics in such embodiments may include voting methods. For example, if two results match, the third unmatching result is likely an error.

Figure 9:
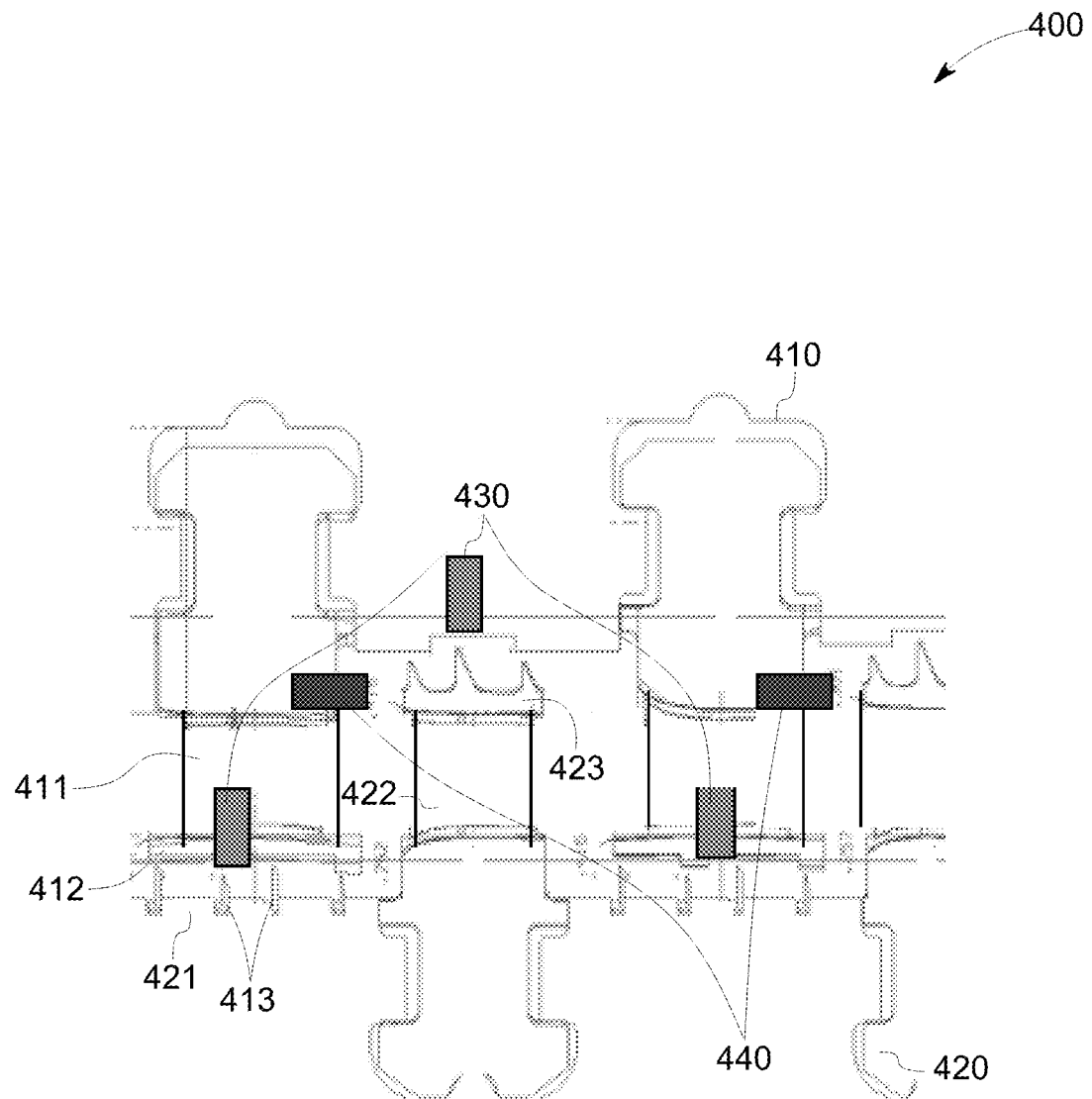
FIG. 9 is a side view showing a schematic steam turbine component incorporating the optical fiber probes.

FIG. 9 is a schematic drawing of a steam turbine component 400 comprising a stator 410, a rotor 420 and optical fiber probes 430 and 440. The stator 410 includes a fixed blade (or nozzle) 411, a fixed blade shroud 412 and/or labyrinth seals. The rotor 420, in one embodiment, includes a shaft 421, rotating blade (or bucket) 422, a shroud, labyrinth tip seals 423, and labyrinth seals 413. Two of the three probes 430 are located at left and right sides of FIG. 9 and are arranged radially to detect radial clearances between the fixed blade shrouds 412 of the stator 410 and the labyrinth seals 413 on the shaft 421 of the rotor 420. The probe 430 in the middle is arranged radially to detect radial clearances between the inner wall of the stator 410 and the blade shroud and/or tip seals 423 of the rotor 420. The probes 440 are arranged axially to detect axial clearances between trailing edges of the stator 410 and blade shroud leading edges of the rotor 420.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   an optical fiber probe comprising a plurality of optical fibers, at least one of the optical fibers comprising a transmission fiber and at least one of the optical fibers comprising a signal fiber;
   a light source for providing light through the transmission fiber towards a target;
   filters for receiving light from the signal fiber, at least two of the filters for filtering different wavelengths;
   at least one photodetector for receiving filtered light from the filters; and
   a processor for using intensities of the signal from the at least one photodetector representative of light intensities at different wavelengths to detect a variation in distance between the optical fiber probe and the target.

2. The system of claim 1, wherein the target comprises a turbo machinery component.

3. The system of claim 2, wherein the turbomachinery component comprises a steam turbine rotor.

4. The system of claim 3, wherein the optical fiber probe comprises a moisture-resistant and temperature resistant enclosure enclosing the optical fibers and a hydrophobic layer situated over an end of the optical fiber probe for preventing moisture from reaching the optical fibers.

5. The system of claim 1, wherein the filters comprise at least three filters.

6. The system of claim 1, wherein the signal fibers comprise at least six signal fibers with each of the filters situated to receive light from at least two respective signal fibers.

7. The system of claim 1, wherein the optical fiber probe comprises an enclosure for enclosing the optical fibers and an optical head comprising a window for transmitting light from and to the optical fibers.

8. The system of claim 7, wherein the enclosure comprises an iron, nickel or steel alloy, and the window comprises sapphire.

9. The system of claim 1, wherein the optical fibers comprise silica multimode fibers.

10. The system of claim 1, further comprising at least one additional optical fiber probe.

11. A system comprising:
    a steam turbine comprising a rotor and a stator;
    a moisture resistant optical fiber probe comprising a plurality of optical fibers, at least one of the optical fibers comprising a transmission fiber and at least three of the optical fibers comprising signal fibers;

a light source for providing light through the transmission fiber towards the steam turbine rotor;

filters for receiving light from the signal fibers and for filtering out unwanted light;

at least one photodetector for receiving filtered light from the filters; and a processor for using intensities of the signals from the at least one photodetector representative of light intensities at different wavelengths to detect a variation in distance between the steam turbine rotor and the steam turbine stator.

\* \* \* \* \*